Jan. 9, 1962  P. R. STAPLES  3,015,878
DIFFERENTIAL EXPANSION OF PRESSURE
WELDED PASSAGEWAY PANEL
Filed July 27, 1956
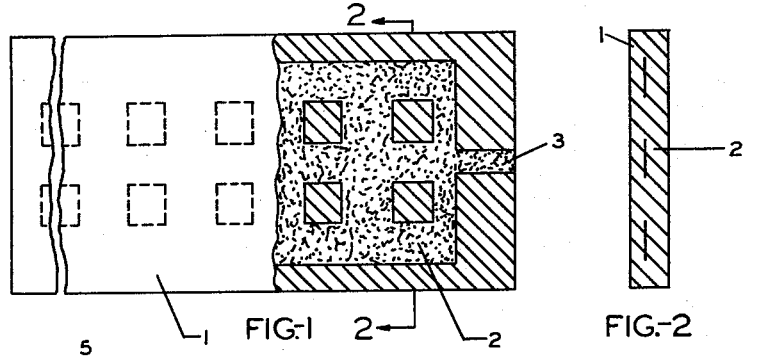
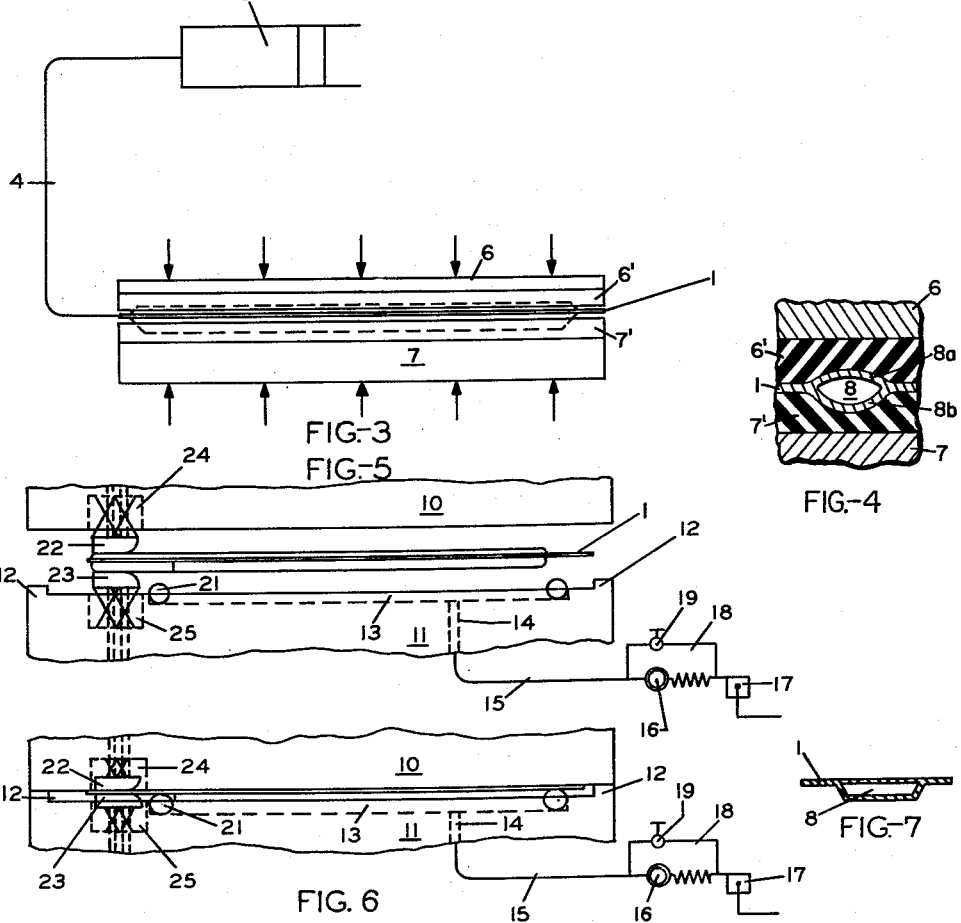
*INVENTOR.*
PAUL R. STAPLES
BY
Arthur H Robert
ATTORNEY

United States Patent Office 3,015,878
Patented Jan. 9, 1962

3,015,878
DIFFERENTIAL EXPANSION OF PRESSURE WELDED PASSAGEWAY PANEL
Paul R. Staples, Louisville, Ky., assignor to Reynolds Metals Co., Louisville, Ky., a corporation of Delaware
Filed July 27, 1956, Ser. No. 600,508
10 Claims. (Cl. 29—157.3)

This invention relates to an improved method of and means for expanding a pressure welded passageway panel, that is, a panel composed of at least two pressure bonded metal sheets containing a potential conduit-forming system of unexpanded flat unbonded areas therebetween.

In some cases, it is desirable to produce an expanded panel which is expanded on one side and flat on the other.

The principal object of this invention is to provide, for expanding a pressure welded passageway panel on one side only, a novel method which produces an increase in the rupture strength of the passageway walls on the flat side. This increase in rupture strength permits a reduction in the thickness of the stock otherwise required for that side.

A further object of this invention is to attain the principal object quickly and inexpensively.

The practice of my invention requires the use of two die presses, one press containing a pair of dies having differentially yieldable platens and the other press containing a pair of dies presenting a flat rigid face on the upper platen and a pan-like liquid cavity on the lower platen with a yieldable O-ring providing sealed engagement between the periphery of the cavity and the margins of the panels and with the cavity providing the depth necessary to receive the expanding portion of the panel and to limit the expansion thereof to a desired degree.

Now, in carrying out my invention, a pressure welded passageway panel is clamped between the differentially yieldable platens and a measured volume of liquid, equal to the volume desired in the passageway system, is pumped into the panel causing it to expand into the yieldable dies which permit one side of the panel to expand to a grater degree than the other thereby producing expanded faces, which, for the sake of simplicity, are hereinafter called the "large" and "small" faces. Thereafter the filled and differentially expanded panel is placed between the other dies with its "large" face over the cavity (which is filled with liquid through a supply system having a relief valve preventing the cavity pressure from exceeding, say, 1,000 p.s.i.), and the upper die is reciprocated through one complete cycle, i.e., one downward and one upward stroke.

During the first part of the down stroke, it operates, through resiliently mounted panel-engaging means, to close the entrance to the passageway system and thereby lock said measured volume of liquid within the panel. During the remainder of the down stroke, it operates to seal the cavity and flatten the small face while simultaneously expanding the large face.

For example, the downwardly moving upper platen first engages the ridges of the expanded passageways on the small face and, through such engagement, forces the margins of the panel downwardly into cavity sealing engagement with the O-ring. With very slight additional but final downward movement, the upper platen moves the panel, as a whole, forcibly downward in relation to both the O-ring and the cavity.

This additional movement further compresses the O-ring and simultaneously flattens the small face. In further compressing the O-ring, it creates a holding pressure within the cavity, which may be predetermined to reach some desired value, say, 1200 p.s.i. As it flattens the small face, the holding pressure pushes the panel upwardly tending to urge it into (and hold it in) flat faced engagement with the upper platen. In this way, it cooperates with the upper platen in flattening the small face. As the small face flattens, the internal pressure of the liquid trapped within the panel increases causing its large face to expand downwardly into flat-faced engagement with the bottom of the cavity.

In this way, the flat face of the panel is mechanically worked along its passageway forming portion and this working of that portion increases the rupture strength thereof. As a consequence, it is possible to use, for the metal sheet forming the flat face of the panel, a smaller thickness of starting stock. Furthermore, the passageways in the final panel are expanded to a precise volume since the degree of expansion is determined by and corresponds with the predetermined volume of the liquid locked within the panel.

The practice of this invention is illustrated in the accompanying drawing wherein:

FIG. 1 is a broken plan view partially in section of an unexpanded passageway panel;

FIG. 2 is a view taken substantially along line 2—2 of FIG. 1, the thickness of the panel being exaggerated for the sake of clarity;

FIG. 3 is a schematic view of the panel expanding apparatus with an initially expanded panel therein;

FIG. 4 is an enlarged fragmentary vertical section of a passageway panel sandwiched between the rubber faced dies of FIG. 3 at the end of the initial expansion operation;

FIG. 5 is a schematic view of the apparatus for flattening and expanding the panel to final form;

FIG. 6 is a schematic view of the apparatus of FIG. 5 at the end of the downstroke; and FIG. 7 is a sectional view of an expanded passageway upon the completion of the flattening and final expanding operation.

In carrying out this invention, a pressure welded unexpanded passageway panel 1 is provided. This panel is formed by sandwiching a suiatble passageway pattern of weld resist material 2 between a pair of metal sheets and forge welding the sheets in the conventional manner. The weld resist is extended to one edge of the panel to provide it with an inlet 3 for its unbonded portions which are also designated by the numeral 2.

In carrying out the first expansion operation, the inlet 3 of the panel is connected, through line 4, to a suitable source of hydraulic pressure liquid, such as hydraulic cylinder 5. Before this connection is made, the panel is positioned between a pair of opposed dies 6, 7. Each die consists of a rigid platen, which is faced with a flat sheet of yieldable material such as rubber, the upper rubber sheet being designated 6' and the lower rubber sheet being designated 7'. These yieldable facing sheets are selected to make the panel engaging die surfaces of differential yieldability. Thus, for example, the face of the upper die 6 may be harder or softer than the face of the lower die 7. For sake of clarity, we shall hereafter assume that the face sheet 6' of the upper die 6 is of harder less-yieldable material than the face sheet 7' of the lower die 7.

In expanding the passageway panel 1, a measured amount of liquid is pumped into it from hydraulic cylinder 5. This measured amount of liquid is selected to provide the panel internally with a volume precisely equal to the final volume of internal passageway space which is desired within the panel. Normally the requisite volume of liquid can be pumped into the panel without developing a pressure equal to the free rupture pressure. This initial expansion pressure, for an appropriate aluminum panel, will normally be less than 800 p.s.i. Its value depends, of course, on many factors, such as the thickness and the hardness of the aluminum or other sheet material used.

As the expansion liquid flows into the panel along its unbonded portions 2, both sides of the panel 1 expand against the dies 6, 7. Since these dies are of unequal resiliency, the harder die 6 will permit a lesser degree of expansion on its side of the panel than is permitted by the softer die 7. Thus, the passageways 8 are expanded less on the side 8a, which is adjacent the harder die, than they are on the side 8b, which is adjacent the softer die. For the sake of clarity and simplicity, these faces of the panel are hereinafter termed the "small" and "large" faces respectively.

When the initial expansion is completed, the panel is disconnected from the hydraulic cylinder 5 and transferred to the second set of dies. This set comprises an upper rigid platen 10 and a lower platen 11. The lower platen has two or more suitable stops 12 to limit the minimum spacing of the platens, a holding cavity 13 which, perimetrically, is smaller than the panel as a whole and larger than its expanded portion. The holding cavity is connected by duct 14, line 15 and pump 16 to a reservoir 17, so that it may be filled with a suitable holding liquid, such as water. A bypass 18, having a relief valve 19, parallels or bypasses the pump 16 so as to prevent the holding pressure, beyond the pump 16, from rising above a desired predetermined value to which the relief valve 19 is set.

The cavity 13 is filled with liquid and the large face of the initially expanded panel is placed over the cavity. The margins of this panel, which lie beyond its expanded area, rest upon an O-ring 21 which encircles the cavity 13. Under these conditions, the press may be operated to cause the upper die to execute one cycle of movement, i.e., one down stroke and one up stroke.

However, in order to maintain the internal volume of the passageway panel system at the predetermined value desired, the measured amount of liquid, used to expand it differentially, must be sealed within it. Here it may be noted that, in disconnecting the panel 1 from the hydraulic system of the first die and transferring it to the second die, it is not necessary to seal the edge opening 3 of the panel since little or no liquid will leak from the panel. However, before the panel is squeezed between dies, the inlet 3 must be sealed.

In order to seal the inlet, a pair of clamping members 22 and 23 are provided on the second press, one on each of the dies 10 and 11. These clamping members 22 and 23 are resiliently mounted on springs or other suitable means arranged in recesses 24 and 25. The resiliently mounted members 22 and 23 normally project from their respective platens. Now, when these platens are moved toward each other, the resilient members 22, 23 are brought into engagement with opposite sides of the panel at the location of its inlet 3. As further movement occurs, they provide sufficient force to collapse the inlet 3 and seal it to prevent any leakage, With further die movement relatively toward each other, the clamping members 22 and 23 are forced to retract within their respective recesses 24 and 25 gradually developing more and more clamping pressure which is always of sufficient magnitude to prevent the escape of the expansion liquid trapped within the panel.

An effective panel seal is thus established before the upper die first engages the ridges on the "small" face of the panel. After this engagement is initially established, further downward movement of the upper die presses the panel against the O-ring thus effecting a seal between the margins of the "large" face of the panel and the margins of the cavity. This seal enables a holding pressure to be created in the holding liquid contained within the cavity. Now, as the upper platen moves downwardly a little further, it will tend to flatten the "small" face and, at the same time, increase the degree of seal between the "large" face of the cavity and the magnitude of the holding pressure within the cavity.

This holding pressure pushes upwardly against the panel and tends to force the top face of that panel into flat faced engagement with the upper die and to hold it there. The holding pressure thus cooperates with the upper die in effecting a flattening of the upper face of the panel.

As the "small" face of the panel flattens, it decreases the internal space within the panel and correspondingly increases the internal hydraulic pressure. This increase in internal pressure forces the panel to move in the only available direction which is downward; hence, the expanded passageway portions of the "large" face are forced to expand downwardly. As a matter of fact, they will be forced downwardly sufficiently to stretch the metal into flattening engagement with the bottom of the cavity and thereby provide expanded passageways on the one side, the ridges of which are flat-topped as shown in FIG. 7.

At the conclusion of the down stroke, the upper platen may be quickly retracted upwardly. The heavy expansion pressure of the liquid locked within the panel may range as much as 2000 p.s.i. more or less above the holding pressure. But when the panel is freed of the platens, this internal pressure is quickly lost upon an expansion so slight that it is for all practical purposes non-existent. Consequently, its release may be effected when convenient.

Thus with the novel process of this invention, a roll bonded sheet is obtained having expanded passageways on one side of the sheet only. The passageways provide the precise volume desired within the passageway system, an important consideration in many products such as refrigerator evaporators. Furthermore, the reworking of the lesser expanded passageways back into the flat side of the panel results in a strain-hardened passageway wall of increased strength. Therefore, the starting sheet thickness on the flat side can be reduced because of this additional strengthening factor.

Having described my invention, I claim:

1. A method of expanding a pressure welded unexpanded passageway panel composed of yieldable work-hardenable metal, comprising: expanding the passageway walls of a panel on its opposite panel faces; and thereafter flattening the passageway walls on one panel face while holding enough liquid in the panel to cause it to effect a simultaneous and additional expansion of the passageway walls on the other panel face.

2. The method of claim 1 wherein: said first expanding step is performed between differentially yieldable dies to effect the differential expansion of the passageway walls so that the walls on the one panel face are expanded less than those on the other panel face to provide a "small face" and a "large" face respectively.

3. The method of claim 2 wherein: said differential expansion operation is performed by introducing a fluid under pressure into said panel while its faces are gripped between a relatively hard resilient die and a relatively soft resilient die, both of said dies being composed of a rubber-like material.

4. The method of claim 3 wherein: the differential expansion operation is performed with a measured volume of expansion liquid.

5. The method of claim 3 wherein: the additional expansion operation is performed with a measured volume of liquid.

6. The method of claim 5 wherein: the differential expansion operation is performed with a measured volume of expansion liquid.

7. The method of claim 6 wherein: the liquid used in the differential expansion operation is sealed in the panel and thereafter used in the additional expansion operation.

8. The method of claim 2 wherein: the additional expansion operation is performed with the panel overlying, and the expanded portion of its large face extending into, a lower die cavity which is filled with a holding liquid and marginally sealed by the overlying panel; and a holding pressure is developed within said cavity, said pressure cooperating with an upper die to flatten the small face.

9. The method of claim 8 wherein: the upper die is moved downward relative to said cavity to create said holding pressure in said cavity.

10. A method of expanding a pressure welded unexpanded passageway panel comprising: expanding the passageway walls of said panel differentially on the opposite panel faces by introducing a fluid under pressure into said panel while its faces are gripped between a relatively hard resilient die and a relatively soft resilient die to provide a "small" expanded passageway wall on one panel face and a "large" expanded passageway wall on the opposite panel face; sealing a measured volume of liquid in said expanded passageway; and flattening said small passageway wall while simultaneously and additionally expanding said large passageway wall by pressing a flat die against the small passageway wall panel face while the large passageway wall panel face is engaged against a second die having a cavity filled with a holding liquid receiving said large passageway wall.

References Cited in the file of this patent

UNITED STATES PATENTS

| | | |
|---|---|---|
| 1,948,832 | Squires | Feb. 27, 1934 |
| 2,662,273 | Long | Dec. 15, 1953 |
| 2,690,002 | Grenell | Sept. 28, 1954 |
| 2,728,317 | Clevenger et al. | Dec. 27, 1955 |
| 2,835,961 | Neel | May 27, 1958 |
| 2,857,658 | Luther | Oct. 28, 1958 |
| 2,857,660 | Staples | Oct. 28, 1958 |